United States Patent [19]
Lang

[11] 3,966,319
[45] June 29, 1976

[54] FLAT FIELD SCANNING MIRROR
[75] Inventor: John M. Lang, Dallas, Tex.
[73] Assignee: Xerox Corporation, Stamford, Conn.
[22] Filed: Apr. 21, 1975
[21] Appl. No.: 570,300

[52] U.S. Cl. .................................. 355/66; 355/8; 355/51; 355/65
[51] Int. Cl.² ..................................... G03B 27/70
[58] Field of Search ............... 355/11, 8, 51, 43, 65, 355/66

[56] References Cited
UNITED STATES PATENTS

| | | | |
|---|---|---|---|
| 3,397,627 | 8/1968 | Bruning et al. | 355/11 X |
| 3,542,467 | 11/1970 | Ferguson et al. | 355/8 |
| 3,576,368 | 4/1971 | Goetz et al. | 355/51 |
| 3,614,222 | 10/1971 | Post et al. | 355/8 |
| 3,630,608 | 12/1971 | Sage | 355/11 X |
| 3,703,334 | 11/1972 | Knechtel et al. | 355/66 X |
| 3,709,592 | 1/1973 | Kawakubo et al. | 355/8 |
| 3,711,199 | 1/1973 | Koizumi | 355/66 X |
| 3,740,137 | 6/1973 | Sato | 355/66 |
| 3,832,057 | 8/1974 | Shogren | 355/8 |
| 3,917,393 | 11/1975 | Nier | 355/8 |

OTHER PUBLICATIONS
Davidge, "Document Scanning Mechanism," IBM Technical Disclosure Bulletin, vol. 15, No. 9, Feb. 1973, p. 2687.

Horlander, —Moving & Tilting Mirror Imaging System," IBM Technical Disclosure Bulletin, vol. 15, No. 9, Feb. 1973, p. 2689.

Primary Examiner—Richard A. Wintercorn
Attorney, Agent, or Firm—Sheldon F. Raizes

[57] ABSTRACT

A rotatable "Y" scan mirror for a flat field scanning system is provided whereby the mirror is shifted in opposite directions transverse to its pivotable axis and is simultaneously rotated in one direction during a scanning cycle. A pair of cams is mounted on a common rotatable shaft for rotation therewith. One of the cams actuates a link connected to a pivot pin on which the mirror rotates. The other cam actuates an arm which is connected to the mirror to rotate the same. The cams are so designed to cause shifting of the mirror to maintain a constant length optical path to the medium being scanned and to cause rotation of the mirror in such a manner that the rate of scanning across the medium will be constant.

17 Claims, 10 Drawing Figures

FLAT FIELD SCANNING MIRROR

DESCRIPTION OF THE INVENTION

This invention concerns a flat field scanning system which maintains a constant length optical path and a constant beam scan velocity.

In prior art flat field scanning systems, it is customary to maintain a constant length optical path during scanning to maintain the optical conjugate of the system. This has been accomplished in the past by moving a scanning mirror. It is also customary to rotate the mirror in such a manner to provide a uniform rate of scanning. U.S. Pat. No. 3,752,573 discloses a flat field scanning system which incorporates these two features. The mirror is moved by shifting a pivot axis 27 therefor in one direction during scanning and at the end of the scanning stroke, the mirror is returned to its start-of-scan position by springs 30. The mirror retraces the full scanning stroke distance when it is returned from its end-of-scan position to its start-of-scan position. A cam 34 is utilized to rotate the mirror 23. The pivot axis 27 and the cam 34 are separately coupled to one or more driving means requiring synchronization at separate locations.

It is an object of the invention to maintain a constant length optical path in a flat field scanning system by shifting a scanning mirror in such a manner that the position of the mirror at the end of scan is near or at the position thereof at the start of scan to permit as little time lag as possible between the end-of-scan and start-of-scan function.

It is proposed to achieve the above object by effecting scanning of a beam in one direction across a medium by shifting a scanning mirror in one direction during a portion of a scan cycle and shifting the mirror in the opposite direction during the remaining portion of the scan cycle while simultaneously rotating the mirror in one direction during the entire scan cycle. This will leave little or no portion of the scanning stroke of the mirror to retrace when the mirror is shifted from the end-of-scan position to start-of-scan position.

It is another object of this invention to scan a beam across a medium at a constant rate.

It is a further object of the invention to synchronize the shifting of the mirror and the rotation of the mirror in a very simple manner by providing a pair of cam surfaces carried on a common rotatable shaft which actuates cam followers which are respectively interconnected to a means for shifting the mirror and to a means for rotating the mirror.

Other objects of the invention will become apparent from the following description with reference to the drawings wherein.

Figure 1:
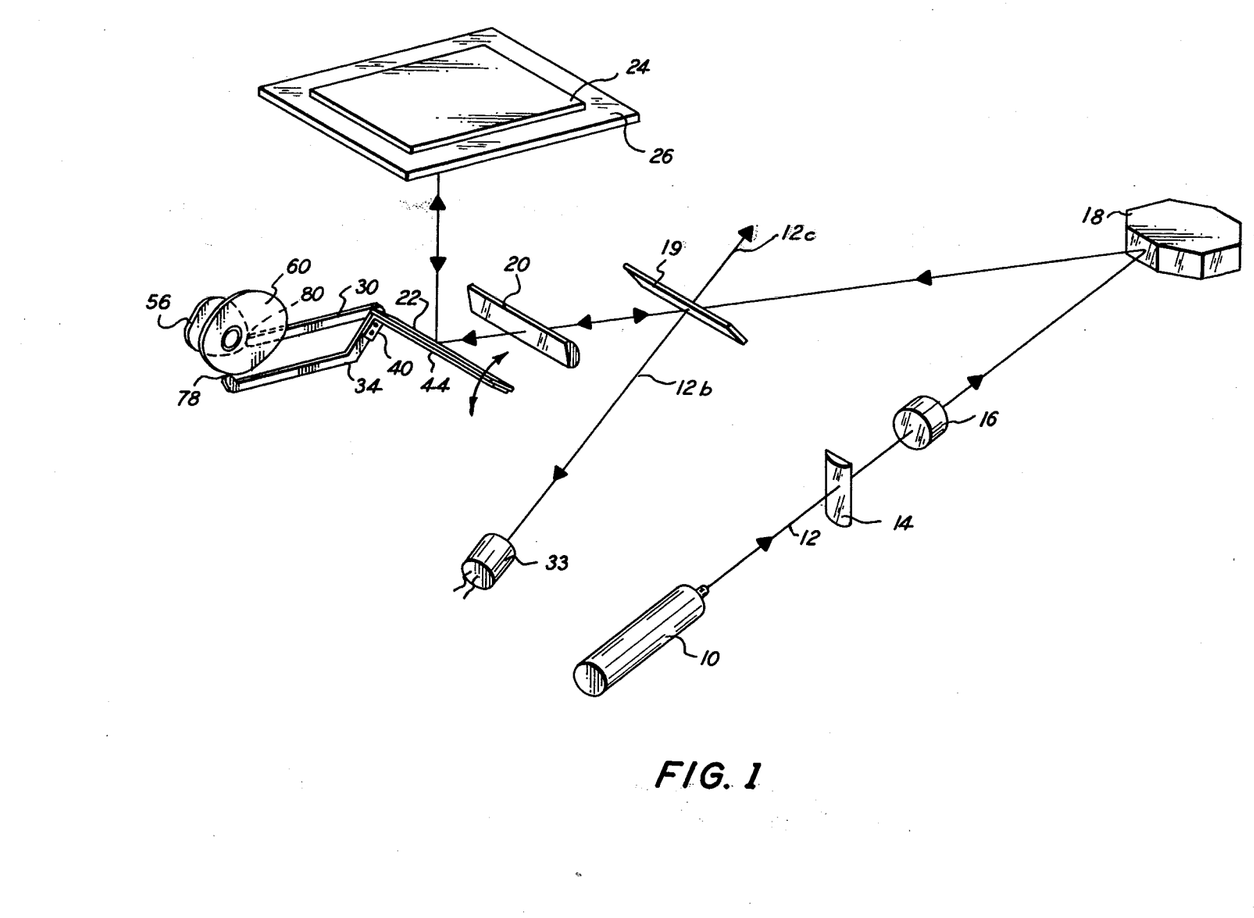
FIG. 1 is a schematic perspective view of a scanning system.
Figure 2:
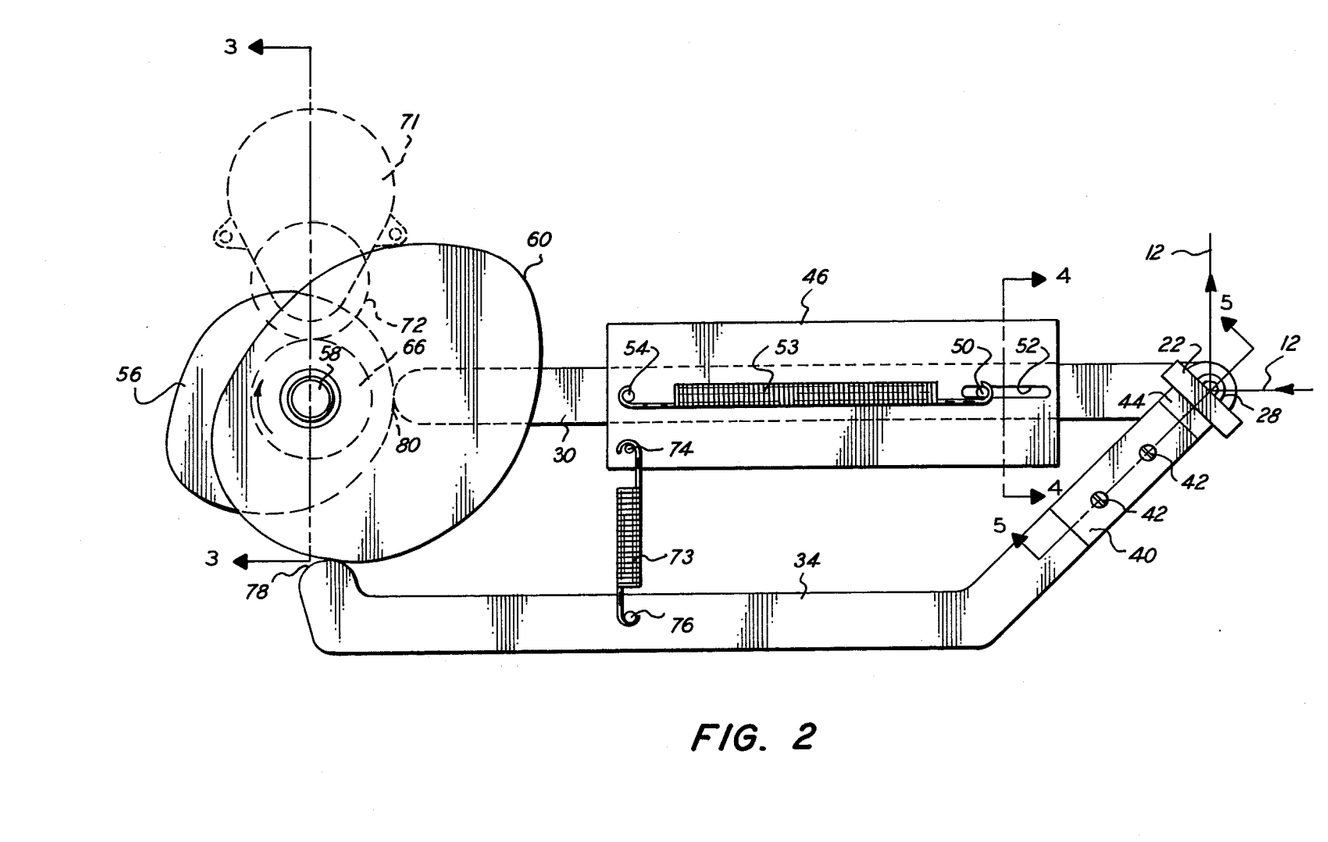
FIG. 2 is an enlarged detailed view of a scanning mirror assembly incorporated in the system illustrated in FIG. 1.
Figure 3:
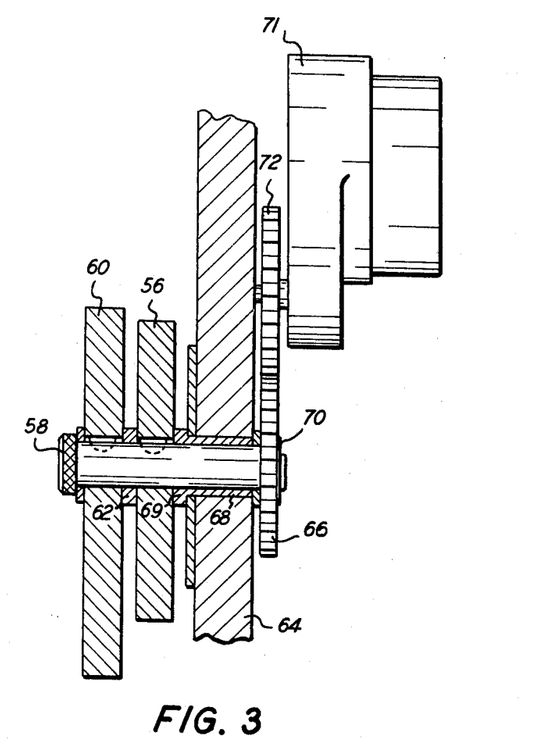
FIG. 3 is a section view taken along section line 3—3 of FIG. 2.
Figure 4:
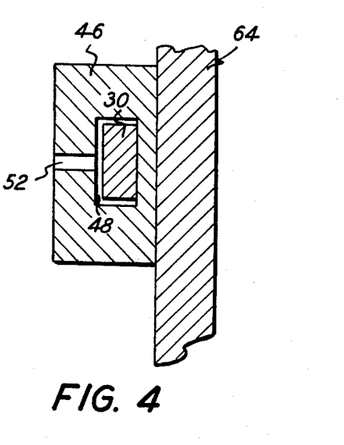
FIG. 4 is a section view taken along section line 4—4 of FIG. 2.
Figure 5:
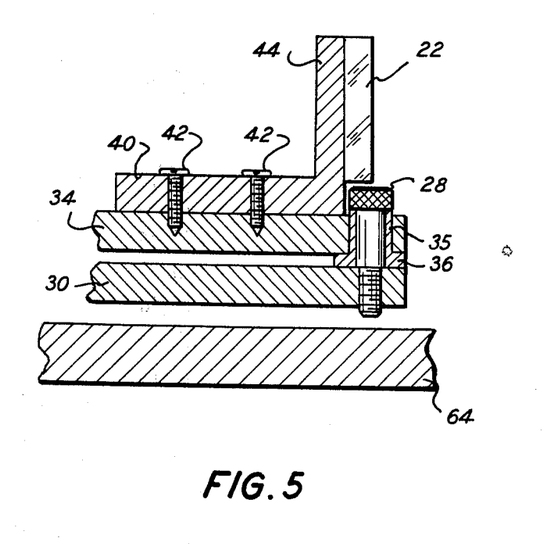
FIG. 5 is a section view taken along section line 5—5 of FIG. 2.

Referring to FIG. 1, an embodiment of the scanning system in accordance with the invention is shown. A light source 10 provides an original light beam 12 for utilization by the scanning system. The light source 10 is preferably a laser which generates a collimated beam of monochromatic light. A cylindrical lens 14 and a spherical imaging lens 16 are fixedly positioned in the optical path between the laser and a rotating polygon scanner 18 which has a plurality of reflecting facets thereon. The cylindrical lens has its power plane in the tangential plane which is substantially perpendicular to the axis of rotation of the polygon 18 and acts to expand the beam 12 in the power plane. The spherical lens 16 causes the beam to converge in both planes and focus in the sagittal plane at the polygon facets. The beam width (in direction of scan) at the polygon will be about the width of two facets. The beam is reflected from the polygon through stationary beam splitter 19 and then through a cylinder lens 20 to a mirror 22 which reflects the beam to a stationary document 24 resting on a flat platen 26 and is reflected from the document back to the beam splitter 19 via mirror 22. The beam 12 approaches mirror 22 from the polygon 18 on a path which is substantially parallel to the plane of the platen 26. A portion 12b of the reflected beam is reflected by the beam splitter 19 to a photomultiplier 33 which converts the variation in intensity of the beam 12b into electrical information signals which are transmitted to a buffer for storage or to a recording device for producing a copy of the document scanned. The other portion 12c of the beam 12, which is reflected by the beam splitter, can be used for synchronization functions or dissipated into space.

The cylinder lens 20 has its power plane in the sagittal plane (parallel to the axis of the polygon). The cylinder lens 14 in conjunction with the imaging lens 16 acts to focus the beam 12 in the tangential plane within a depth of focus which lies on the top surface of the platen 26 on which the document 24 rests. The imaging lens 16 and the cylinder lens 20 act in conjunction to focus the beam 12 in the sagittal plane within a depth of focus which also lies on the top surface of the platen on which the document 24 rests.

The beam 12 from the laser 10 is scanned across the length of the cylinder lens 20 and mirror 22 and thereby across the width of the document 24 to effect a scan in an "X" direction. The mirror rotates about a pivot pin 28 to scan the beam 12 across the length of the document 24 to provide a scan in a "Y" direction.

Referring to FIGS. 2–5 for particulars of the mechanism for operating the scan mirror 22, a slidable link 30 is provided with an opening which receives the pivot pin 28 therein. The pin 28 is threadedly connected at one end to the bar 30 and is thereby fixedly secured thereto. An arm 34 has an opening at one end through which a bushing 35 and the pivot pin 28 extend. The bushing 35 is fixed to the link 30 by the pin 28 and is smooth to allow relative movement between the bushing and the arm 34. The bushing has a spacer flange 36 located between the bar 30 and the arm 34 to separate the same. A mirror bracket 40 is secured to the arm 34 by a pair of screws 42 and has a flange 44 extending outwards therefrom at a right angle thereto. The mirror 22 is fixed to the flange and is so located above the pin that the axis of the pin 28 is in the plane of the reflecting surface of the mirror.

A stationary bracket box 46 has a slot 48 slidably receiving the link 30 therethrough. A protrusion 50 is fixed to the bar 30 and extends upwards through an elongated slot 52 in the bracket box 46 for slidable movement therein. A coil spring 53 is attached at one end to the protrusion 50 and at its other end to a pin 54 fixed on the bracket 46 to urge the link 30 into engagement with a cam 56. The cam 56 and a second cam 60 are fixed to a shaft 58 by a splined interconnection for rotation therewith. A spacer 62 separates the cams from each other. The shaft 58 extends through a bushing 68 in the support which permits rotation of the shaft relative to the support wall 64 and is fixed by a splined interconnection to a rotatable gear 66. The bushing has a spacer flange 69 at one end which separates the cam 56 from the support 64 and extends beyond the wall 64 at the other end to separate the gear 66 from the wall. A snap ring 70 is secured to the shaft 58 to hold the various elements assembled. A motor 71 is mounted on the wall and drives a gear 72 which is rotatably connected to the wall 64 and intermeshes with gear 66 to drive the same and thereby the shaft 58 and cams 56 and 60 in a clockwise direction.

A coil spring 73 is connected to a pin 74, fixed to the bracket 46, and is connected at its other end to a protrusion 76, fixed to the arm 34, to urge the arm into engagement with the cam 60. The arm 34 has a cam follower surface 78 which engages the cam 60 and the link 30 has a cam follower surface 80 which engages the cam 56. The cam 56 is so designed that at the start of scan position it will shift the pivot pin 28 and thereby the mirror 22 in a direction away from the cylinder lens 20 to a midscan position under the center of the platen in the "Y" direction, and then moves the pin 28 and thereby the mirror 22 back towards the lens 20 to an end-of-scan position. The cam 60 is so designed to rotate the mirror 22 from an angle at the start of scan, which is less than 45° with the beam, to a 45° angle with the beam at midscan, and to an angle which is greater than 45° with the beam at the end of scan. The cams are also so designed to cause shifting of the pivot pin 28 and thereby the mirror 22 by link 30 and to cause rotation of the mirror 22 by arm 34 to effect a constant beam path length to the document 24 and to scan the document at a constant rate during scanning in the "Y" direction by mirror 22.

In the particular construction just described, the extension of the axis of the pivot pin 28 and the line of intersection of the beam 12 with the mirror is coincident. In the following, when referring to a location or reference point of the mirror, such shall mean the line of intersection of the beam with the mirror.

The following is an explanation of how the system is designed to effect such constant path length and constant rate of scan.

Figure 6A:
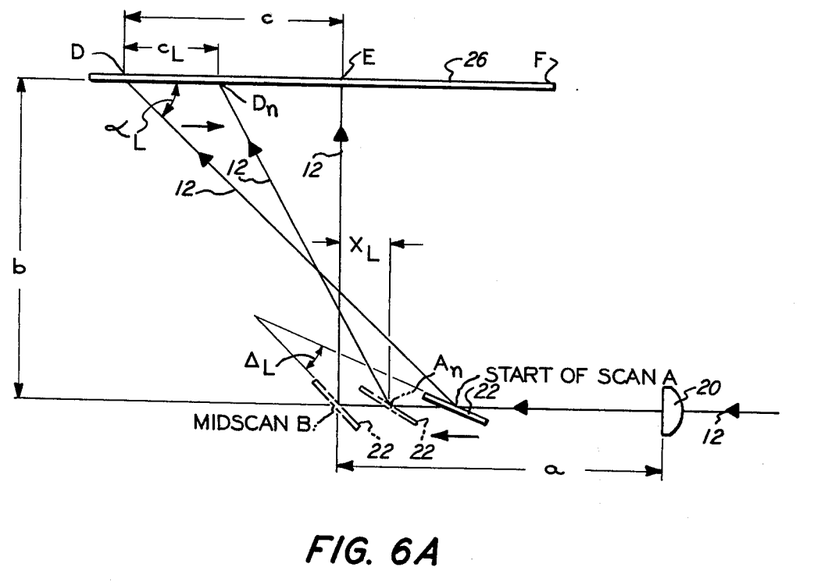
FIG. 6A is a beam and mirror position schematic of one-half a scan cycle for calculation purposes.
Figure 6B:
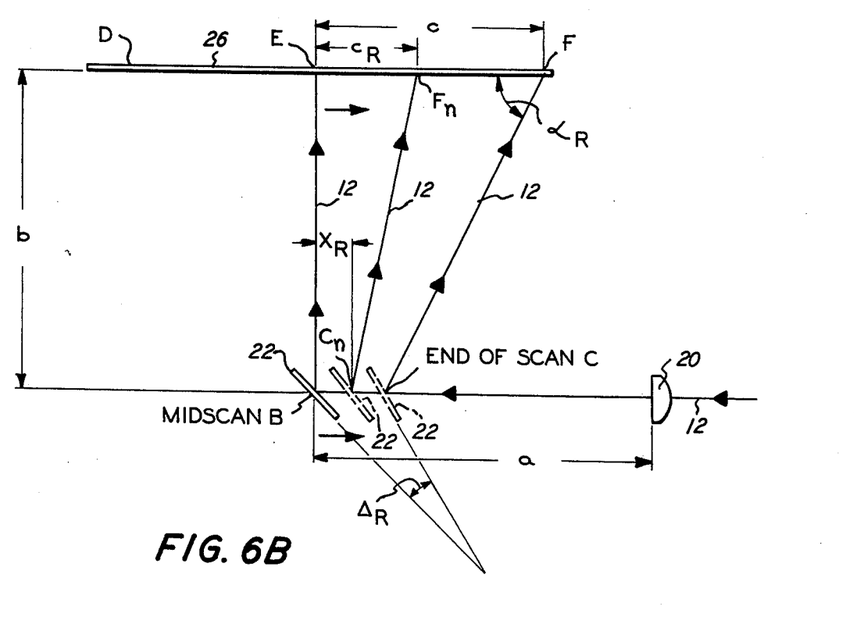
FIG. 6B is a beam and mirror position schematic of the remaining one-half a scan cycle for calculation purposes.

Referring to FIGS. 6A and 6B:

Let position $A$ = The start-of-scan location for the mirror 22.

Let position $B$ = The midscan location for the mirror 22 when the mirror 22 is at a 45° angle with the beam and scans the beam to the center of and perpendicular to the platen 26 in the "Y" direction.

Let position $C$ = The end-of-scan location for the mirror 22.

Let position $D$ = The line of intersection between the beam 12 and the platen 26 at the start of scan.

Let position $E$ = The line of intersection between the beam 12 and the platen at midscan.

Let position $F$ = The line of intersection between the beam 12 and the platen at the end of scan.

Let $a$ = The distance from the cylinder lens 20 to the mirror 22 when the mirror is at position B.

Let $b$ = The perpendicular distance from the mirror 22 to the platen.

Let $c$ = Half the beam scan distance at the platen 26 in the "Y" direction.

Let $c_L$ = The distance scanned on the platen in the "Y" direction at any given instant on the left half section of the platen as the mirror moves from position A to position B.

Let $c_R$ = The distance scanned on the platen in the "Y" direction at any given instant on the right half section of the platen as the mirror 22 moves from position B to position C.

Let $X_L$ = The distance the mirror 22 is from position B during movement from position A to position B.

Let $X_R$ = The distance the mirror 22 is from position B during movement from position B to position C.

Let $\alpha_L°$ = Angle between the beam path and the platen at any given instant as the mirror 22 moves from position A to position B.

Let $\alpha_R°$ = Angle between the beam path and the platen at any given instant as the mirror 22 moves from position B to position C.

Let $\Delta_L°$ = Change in rotational angle at any position of the mirror between positions A and B.

Let $\Delta_R°$ = Change in rotational angle at any position of the mirror 22 between positions B and C.

Let $A_nD_n$ = The distance the beam travels from the mirror 22 to the platen during scanning at any mirror position when the mirror moves from position A to position B.

Let $C_nF_n$ = The distance the beam travels from the mirror 22 to the platen 26 during scanning at any mirror position when the mirror moves from position B to position C.

Let $K$ = Constant beam path distance from lens 20 to the platen 26.

Referring to FIG. 6A, beam distance $A_nD_n$ at any time between start of scan to midscan is found by solving for the hypotenuse of a right triangle:

$$A_nD_n = \sqrt{b^2 + [X_L + (c - c_L)]^2} \qquad 1.$$

Defining the constant beam path:

$$K = A_nD_n + (a - X_L) \qquad 2.$$

Substituting equation (1) for $A_nD_n$ in equation (2)

$$\begin{aligned}K &= \sqrt{b^2 + [X_L + (c - c_L)]^2} + (a - X_L) \quad K - a + X_L \\ &= \sqrt{b^2 + [X_L + (c - c_L)]^2}(K - a + X_L)^2 = b^2 + [X_L \\ &+ (c - c_L)]^2 \; K^2 - 2ak + 2KX_L + a^2 - 2aX_L + X_L^2 = \\ &b^2 + c^2 - 2cc_L + 2cX_L + c_L^2 - 2c_LX_L + X_L^2 \; 2KX_L - \\ &2aX_L - 2cX_L + 2\,c_LX_L = b^2 + c^2 - 2cc_L + c_L^2 - K^2 \\ &- 2aK - a^2\end{aligned} \qquad 3.$$

Solving for $X_L$:

$$X_L = \frac{b^2 + c^2 - 2cc_L + c_L^2 - K^2 - 2aK - a^2}{2K - 2a - 2c + 2c_L} \qquad 4.$$

The distances $a, b, c$ are selected by the designer and, therefore, are known and constant. Also, $K$ is known since at midscan:

$$a + b = K$$

Thus, at any scanned increment ($c_L$), the corresponding location ($X_L$) of the mirror 22 can be determined.

The angle of the beam BE to the platen 26 at the midscan position B can be selected. In this particular case, the angle is 90°. During scanning, as the mirror moves from position A to position B, the angle of the beam to the platen changes from $\alpha_R°$ to 90° with the change being at any instant represented by the expression (90° − $\alpha_L°$). The change in $\Delta_L°$ is half the change of the angle of the beam to platen or:

$$\Delta_L° = \tfrac{1}{2}(90° - \alpha_L°) \qquad 5.$$

By using a right triangle:

$$\alpha_L° = \mathrm{Tan}^{-1}\left[\frac{b}{X_L + (C - c_L)}\right] \qquad 6.$$

Substituting equation (6) for $\alpha_R°$ in equation (5):

$$\Delta_L° = \tfrac{1}{2}[90° - \mathrm{Tan}^{-1}\frac{b}{X_L + c - c_L}] \qquad 7.$$

Referring to FIG. 6B, the beam distance $C_nF_n$ at any time between midscan to end of scan is found by solving for the hypotenuse of a right triangle:

$$C_nF_n = \sqrt{b^2 + (c_R - X_R)^2} \qquad 8.$$
$$K = a - X_R + C_nF_n \qquad 9.$$
$$K = a - X_R + \sqrt{b^2 + (c_R - X_R)^2} \qquad 10.$$

Solving equation (10) for $X_R$:

$$X_R = \frac{a^2 + b^2 + c_R^2 - K^2}{2c_R} \qquad 11.$$

During scanning as the mirror moves from position B to position C, the angle of the beam to the platen changes from 90° to $\alpha_R°$ with the change being at any instant represented by the expression (90° − $\alpha_R°$). Again, the change in $\Delta_R°$ is half the change of the angle of the beam to platen or:

$$\Delta_R° = \tfrac{1}{2}(90° - \alpha_R°) \qquad 12.$$

By using a right triangle:

$$\alpha_R° = \mathrm{Tan}^{-1}\left(\frac{b}{c_R - X_R}\right) \qquad 13.$$

Substituting equation (13) for $\alpha_R°$ in equation (12):

$$\Delta_R° \tfrac{1}{2}(90° - \mathrm{Tan}^{-1}\frac{b}{c_R - X_R}) \qquad 14.$$

The following is an illustration of applying the above principles to the construction described:

Let $a = 1.000$ inch.
Let $b = 9.000$ inches.
Let $c = 1.630$ inches.
Let $c_L$ and $c_R$ increase by 0.326 inch increments.
Assume uniform scanning from start of scan to end of scan is completed in 300 milliseconds.

Referring to the table below, the values of $X_L$ were arrived at by using equation (4); the values of $\Delta_L°$ were arrived at by using equation (7); the values of $X_R$ were arrived at by using equation (11); and the values of $\Delta_R°$ were arrived at by using equation (14).

TABLE

| Time (milliseconds) | $X_L$ (inches) | $\Delta_L°$ | $X_R$ (inches) | $\Delta_R°$ |
|---|---|---|---|---|
| 0 | 0.180 | 5.579° | 0 | 0 |
| 30 | 0.111 | 4.472° | 0 | 0 |
| 60 | 0.060 | 3.292° | 0 | 0 |
| 90 | 0.026 | 2.155° | 0 | 0 |
| 120 | 0.006 | 1.058° | 0 | 0 |
| 150 | 0 | 0 | 0 | 0 |
| 180 | 0 | 0 | 0.006 | 1.020° |
| 210 | 0 | 0 | 0.022 | 2.004° |
| 240 | 0 | 0 | 0.048 | 2.953° |
| 270 | 0 | 0 | 0.083 | 3.870° |
| 300 | 0 | 0 | 0.125 | 4.752° |

The cams 56 and 60 are designed that the link 30 and the arm 34 riding thereon, respectively, will shift the pivot pin 28 and thereby the mirror 22 and rotate the mirror in accordance with the values given in the table. For instance, after 90 milliseconds into the scan, the cam 56 should have effected movement of the mirror from position A so that it is 0.026 inch from position B and cam 60 should have effected rotation of the mirror 2.155° from its starting angle of 39.421° with the beam to 41.576°. After 240 milliseconds, mirror 22 should have been moved 0.048 inch from position B towards position C, and the mirror should have rotated 2.953° from its midscan angle of 45° with the beam to 47.953°.

After the scan is completed, the remaining portion of the cams is used to return the mirror to its start-of-scan position. At the end of scan position C, the pivot pin 28 and the mirror are 0.125 inch ($X_R$ at 300 milliseconds) from position B while at the start-of-scan position ($X_L$ at 0 milliseconds), the pivot pin 28 and mirror are 0.18 inch from position B. This means that the pivot pin only has to be returned 0.055 inch from the end-of-scan position (position C) to start-of-scan position (position A) or about 18% of the total scan stroke. At the end-of-scan position C, the mirror 22 is at 49.752° with the beam while at the start-of-scan position, the mirror is at 39.421° with the beam. This means that the mirror has to be rotated through 10.331° to start-of-scan position. The fact that the return stroke of the mirror is only about 18% of its total stroke allows for a very quick return. The return rotational action of the mirror is also accomplished within the same timespan. This very quick return action will permit many more lines to be scanned in a given period of time than would be possible if the return stroke were equal to the much larger scanning stroke. Generally, for this quick mirror return action, the distance between positions B and C will be at least one-half the distance between positions A and B.

The construction of the cams on the same shaft allows for easy synchronization between the cams as compared to cams or other driving means connected to separate shafts or controllers. Obviously, the smaller the increments selected for the design of the cam, the more precise the scanning function becomes. The ten increments selected for the above example would not produce as accurate a scanner as a 20 or 30 increment design would.

Figure 7:
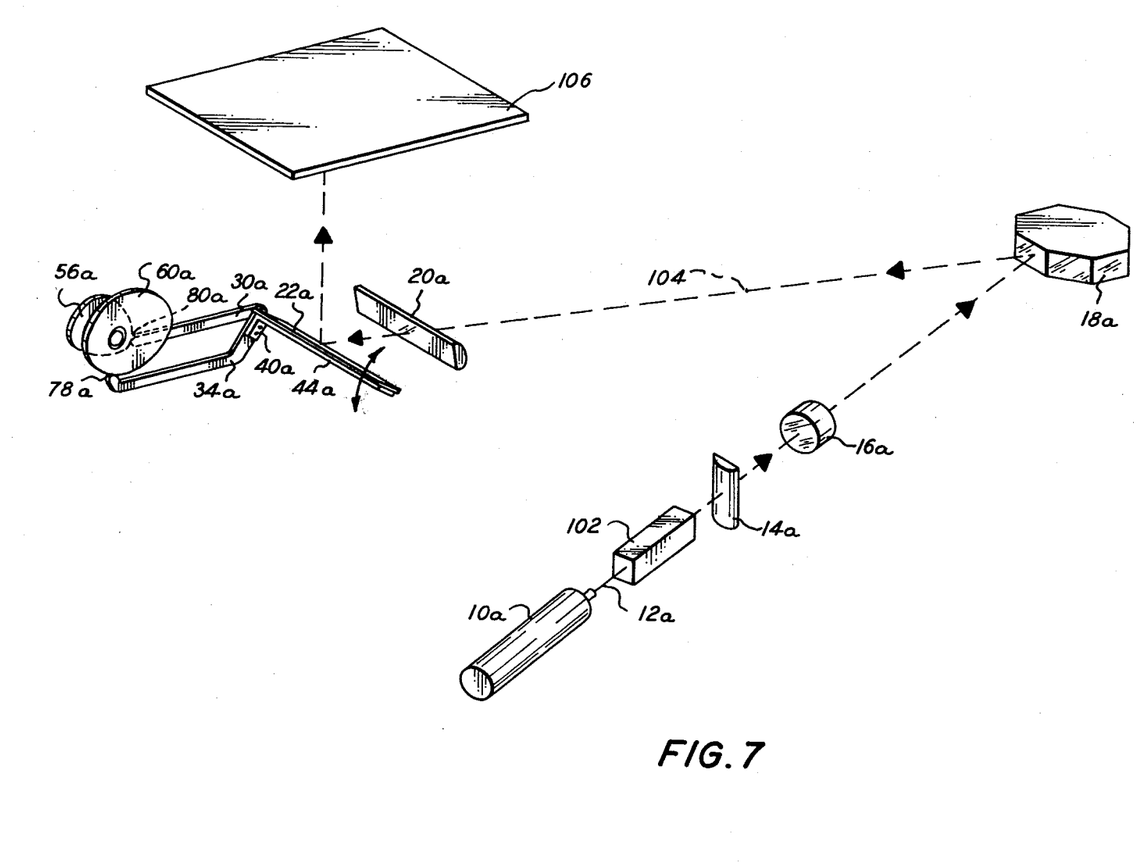
FIG. 7 is a schematic perspective view of another scanning system employing the scanning mirror assembly of the system of FIG. 1.

Referring to FIG. 7, the scanning mirror assembly of the embodiment of FIG. 1 is shown being utilized in another flat field scanning system. All elements, which are the same as the embodiment of FIG. 1, are designated by the same reference numerals only with an *a* affixed thereto. The beam 12 is modulated by a modulator 102 to provide a modulated beam 104. The modulated beam is scanned by mirror 22*a* to a planar stationary recording medium 106. The recording medium 106 may be a Ruticon. A Ruticon 102 is a solid-state cyclic image recording device which is a layered structure consisting of a conductive transparent substrate, a thin photoconductive layer, a thin deformable elastomer layer, and a deformable electrode such as a conductive liquid, a conductive gas or a thin flexible metal layer. When an electric field is placed between the conductive substrate and the deformable electrode, the elastomer will deform into a surface relief pattern corresponding to a light-intensity distribution of an image focused on the photoconductor. Light modulated by the deformation of the elastomer surface can in turn be converted to an intensity distribution similar to the original image by means of simple optics. More information on the Ruticon may be found in IEEE TRANSACTIONS ON ELECTRON DEVICES, Vol. ED-19, No. 9, September, 1972, pages 1003–1010, which is hereby incorporated herein by reference.

In this embodiment, an image is being printed on the Ruticon by modulating the beam 104 at the proper instant. The image on the Ruticon 102 may be read out with a phase-sensitive optical readout system such as a Schlierren system and may be directed to a real time visual display.

Figure 8:
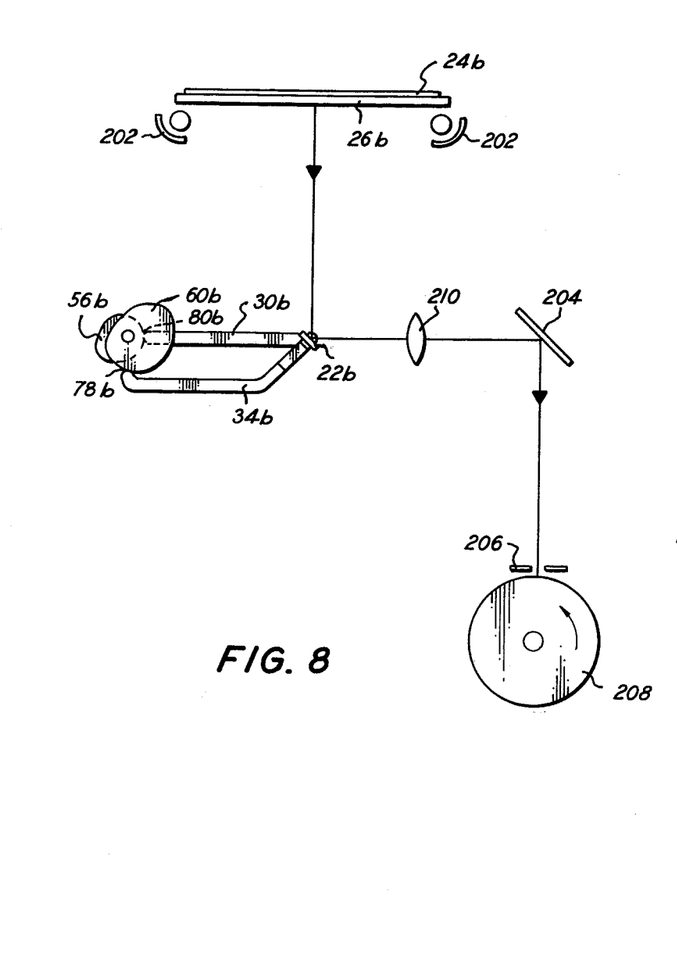
FIG. 8 is a schematic side view of yet another scanning system employing the scanning mirror assembly of FIG. 1.

Referring to FIG. 8, the scanning mirror assembly of the embodiment of FIG. 1 is shown being utilized in still another scanning system. All elements, which are the same as the embodiment of FIG. 1, are designated by the same reference numerals only with a *b* affixed thereto. In this embodiment, document 24*b* is illuminated by floodlamps 202. The mirror 22*b* performs a "Y" scan on the document 24*b* and reflects via a fixed mirror 204 successive increments of an image on the document through a slit in a mask 206 to a rotating xerographic photoconductor drum 208 to form a latent image thereon. The image on the document is imaged to the photoconductor 208 by an imaging lens 210. The latent image is developed by any well-known xerographic method and then transferred to a copy medium, again by any well-known method.

Figure 9:
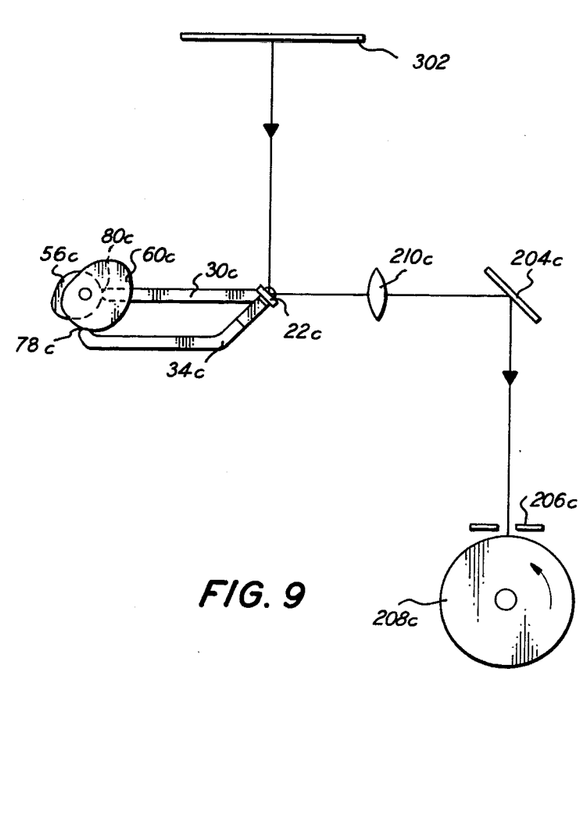
FIG. 9 is a schematic view of the scanning system of FIG. 8 employing an LED image display.

Rather than scan an image on a document to a photoconductor drum, as shown in FIG. 8, the scanning mirror mechanism may also be used to scan an image which is the source of illumination, such as an image on a CRT tube or a planar light emitting diode (LED) display, to a photoconductor drum. This is illustrated in FIG. 9 where all elements, which are the same as the embodiments of FIGS. 1 and 8, are designated by the same reference numeral only with a *c* affixed thereto. In this figure, the image appears on an LED display 302.

In the above embodiments, the pivotal axis of the mirror has been described as being in the plane of the reflecting face of the mirror 22. Obviously, while this is a desired construction, the pivotal axis may be offset from the plane of the reflecting surface. Also, the mid-scan position for mirror 22 may be picked at a location where the beam 12 reflected therefrom strikes the platen at its midpoint E at an angle other than 90°. Furthermore, the mirror may change directions in shifting at some position other than a midscan position. Also, the beam 12 may approach the mirror 22 on a path at an angle to the platen 26 rather than parallel thereto as shown in FIGS. 1–6. Any one of these variations require more complex calculations than that required for the previously described scanning mirror embodiment, but the same principles thereof would still apply.

What is claimed is:

1. In a flat field scanning system having an illumination source generating a collimated beam, a stationary planar medium, a scanning mirror rotatable about an axis and interposed between said source and said medium and arranged to reflect said beam to said medium in successive increments in one direction across said medium during rotation thereof, a first cam follower, a second cam follower, means connecting said first cam follower to said mirror for shifting said mirror in a direction transverse to its rotational axis, means connecting said second cam follower to said mirror for pivoting the same about said rotational axis, a first cam, a second cam, the improvement comprising: a shaft, means for rotating said shaft in one direction, said cams being mounted on said shaft for rotation therewith, means urging said first cam follower into engagement with the surface of said first cam, means urging said second cam follower into engagement with the surface of said second cam, the surface of said first cam being so designed to effect shifting said mirror in one direction along a transverse path to the rotational axis thereof from a start-of-scan position to an intermediate scan position and to shift said mirror in the opposite direction from the intermediate scan position to an end-of-scan position and maintain a substantially constant length optical path from said source to said medium, the surface of said second cam being so designed to cause rotation of said mirror about its rotational axis in one direction during movement thereof from the start-of-scan position to the end-of-scan position in such a manner that said beam will be scanned at a substantially constant rate onto said medium.

2. A scanning system as recited in claim 1 wherein said means connecting said first cam follower to said mirror is a link, and means guiding said link for reciprocal movement along a linear path.

3. A scanning system as recited in claim 1 wherein said mirror is planar and the rotational axis thereof is in the plane of the surface of said mirror.

4. A scanning system as recited in claim 1 wherein said mirror at said intermediate position has completed one-half a scan cycle.

5. A scanning system as recited in claim 1 wherein the shifting of the mirror in said opposite direction from said intermediate position to said end-of-scan position is at least one-half the distance the mirror is shifted in said one direction from said start-of-scan position to said intermediate scan position.

6. A scanning system as recited in claim 1 wherein said medium contains an image thereon, a polygon scanner member interposed between said source and said mirror and scanning said beam across said mirror in a direction generally parallel to the rotational axis of said mirror, and means for receiving diffuse reflections from said medium and converting intensity variations in said deflections into electrical signals representing the image scanned.

7. A scanning system as recited in claim 1 wherein said medium is a recording medium, means for modulating said beam, a polygon scanner member interposed between said source and said mirror and scanning said modulated beam across said mirror in a direction generally parallel to the rotational axis of said mirror.

8. In a flat field scanning system having a planar platen, a stationary image containing medium on said platen, means for illuminating said document, a recording medium, a scanning mirror rotatable about an axis and interposed between said platen and said recording medium and arranged to scan across said image containing medium in one direction and reflect successive increments of the image to said recording medium during rotation thereof, a first cam follower, a second cam follower, means connecting said first cam follower to said mirror for shifting said mirror in a direction transverse to its rotational axis, means connecting said second cam follower to said mirror for pivoting the same about said rotational axis, a first cam, a second cam, the improvement comprising: a shaft, means for rotating said shaft in one direction, said cams being mounted on said shaft for rotation therewith, means urging said first cam follower into engagement with the surface of said first cam, means urging said second cam follower into engagement with the surface of said second cam, the surface of said first cam being so designed to effect shifting said mirror in one direction along a transverse path to the rotational axis thereof from a start-of-scan position to an intermediate scan position and to shift said mirror in the opposite direction from the intermediate scan position to an end-of-scan position and maintain a substantially constant length optical path from said platen to said recording medium, the surface of said second cam being so designed to cause rotation of said mirror about its rotational axis in one direction during movement thereof from the start-of-scan position to the end-of-scan position in such a manner that the image on said image containing medium will be scanned by said mirror at a substantially constant rate.

9. A scanning system as recited in claim 8 wherein said means connecting said first cam follower to said mirror is a link, and means guiding said link for reciprocal movement along a linear path.

10. A scanning system as recited in claim 8 wherein said mirror is planar and the rotational axis thereof is in the plane of the surface of said mirror.

11. A scanning system as recited in claim 8 wherein said mirror at said intermediate position has completed one-half a scan cycle.

12. A scanning system as recited in claim 8 wherein the shifting of the mirror in said opposite direction from said intermediate position to said end-of-scan position is at least one-half the distance the mirror is shifted in said one direction from said start-of-scan position to said intermediate scan position.

13. In a flat field scanning system, a member having a generally planar surface with a self-illuminated image thereon, a recording medium, a scanning mirror rotatable about an axis and interposed between said planar surface and said recording medium and arranged to scan across said planar surface in one direction and reflect successive increments of the image thereon to said recording medium during rotation thereof, a first cam follower, a second cam follower, means connecting said first cam follower to said mirror for shifting said mirror in a direction transverse to its rotational axis, means connecting said second cam follower to said mirror for pivoting the same about said rotational axis, a first cam, a second cam, the improvement comprising: a shaft, means for rotating said shaft in one direction, said cams being mounted on said shaft for rotation therewith, means urging said first cam follower into engagement with the surface of said first cam, means urging said second cam follower into engagement with the surface of said second cam, the surface of said first cam being so designed to effect shifting said mirror in one direction along a transverse path to the rotational axis thereof from a start-of-scan position to an intermediate scan position and to shift said mirror in the opposite direction from the intermediate scan position to an end-of-scan position and maintain a substantially constant length optical path from said planar surface to said recording medium, the surface of said second cam being so designed to cause rotation of said mirror about its rotational axis in one direction during movement thereof from the start-of-scan position to the end-of-scan position in such a manner that the image on said planar surface will be scanned by said mirror at a substantially constant rate.

14. A scanning system as recited in claim 13 wherein said means connecting said first cam follower to said mirror is a link, and means guiding said link for reciprocal movement along a linear path.

15. A scanning system as recited in claim 13 wherein said mirror is planar and the rotational axis thereof is in the plane of the surface of said mirror.

16. A scanning system as recited in claim 13 wherein said mirror at said intermediate position has completed one-half a scan cycle.

17. A scanning system as recited in claim 13 wherein the shifting of the mirror in said opposite direction from said intermediate position to said end-of-scan position is at least one-half the distance the mirror is shifted in said one direction from said start-of-scan position to said intermediate scan position.

* * * * *

UNITED STATES PATENT AND TRADEMARK OFFICE
CERTIFICATE OF CORRECTION

PATENT NO. : 3,966,319
DATED : June 29, 1976
INVENTOR(S) : John M. Lang

It is certified that error appears in the above-identified patent and that said Letters Patent are hereby corrected as shown below:

Column 5, change equation 6 to read as follows:

$$\alpha_L{}^\circ = \text{Tan}^{-1}[\frac{b}{X_L + (c - c_L)}]$$

Column 5, change equation 7 to read as follows:

$$\Delta_L{}^\circ = 1/2[90^\circ - \text{Tan}^{-1}\frac{b}{X_L + c - c_L}]$$

Column 5, change equation 13 to read as follows:

$$\alpha_R{}^\circ = \text{Tan}^{-1}(\frac{b}{c_R - X_R})$$

Column 5, change equation 14 to read as follows:

$$\Delta_R{}^\circ = 1/2(90^\circ - \text{Tan}^{-1}\frac{b}{c_R - X_R})$$

Column 6, line 46, change the parentheses to read as follows:

($X_L$ at 0 milliseconds)

Signed and Sealed this

Twenty-eighth Day of December 1976

[SEAL]

Attest:

RUTH C. MASON
*Attesting Officer*

C. MARSHALL DANN
*Commissioner of Patents and Trademarks*